United States Patent Office 3,271,572
Patented Sept. 6, 1966

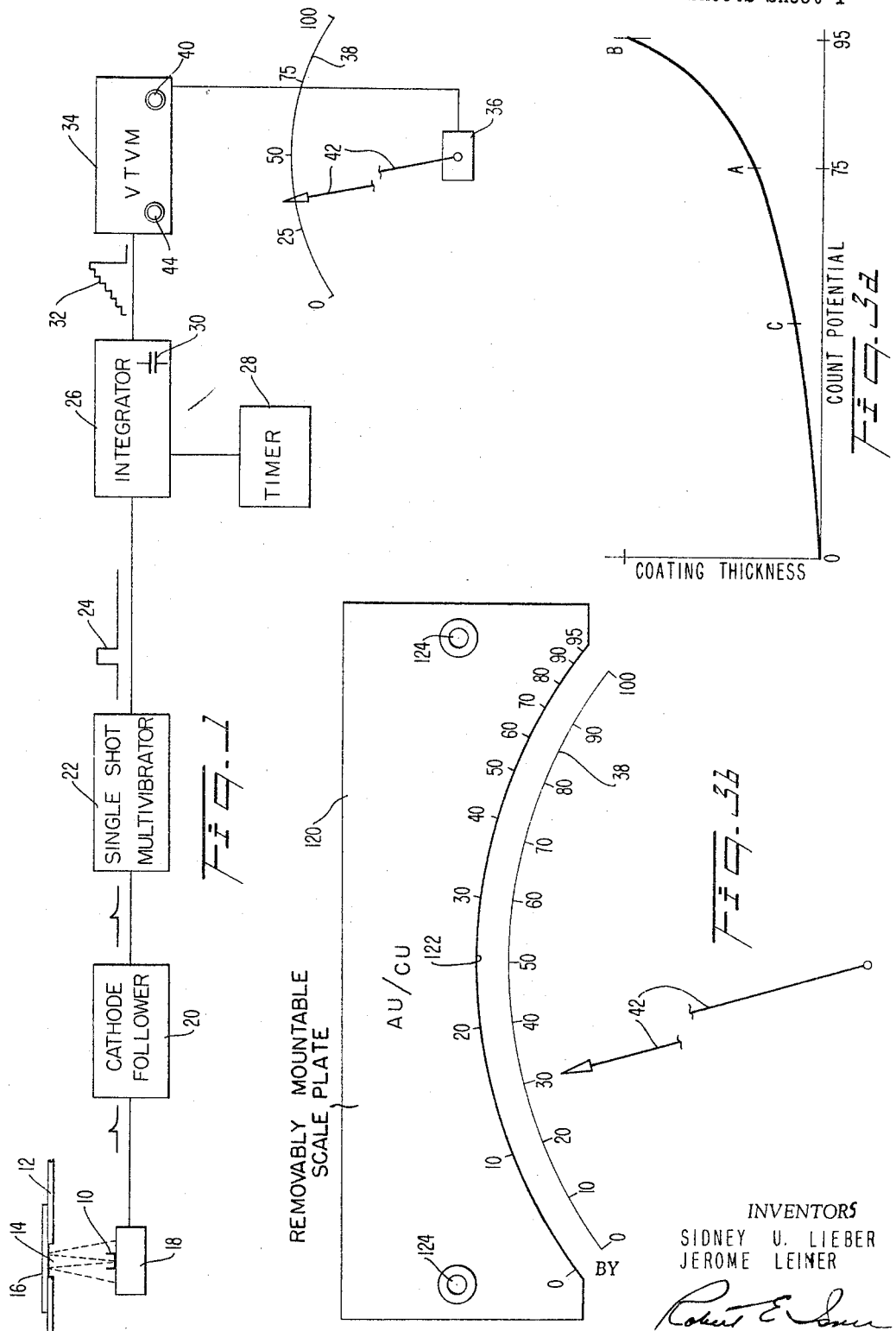

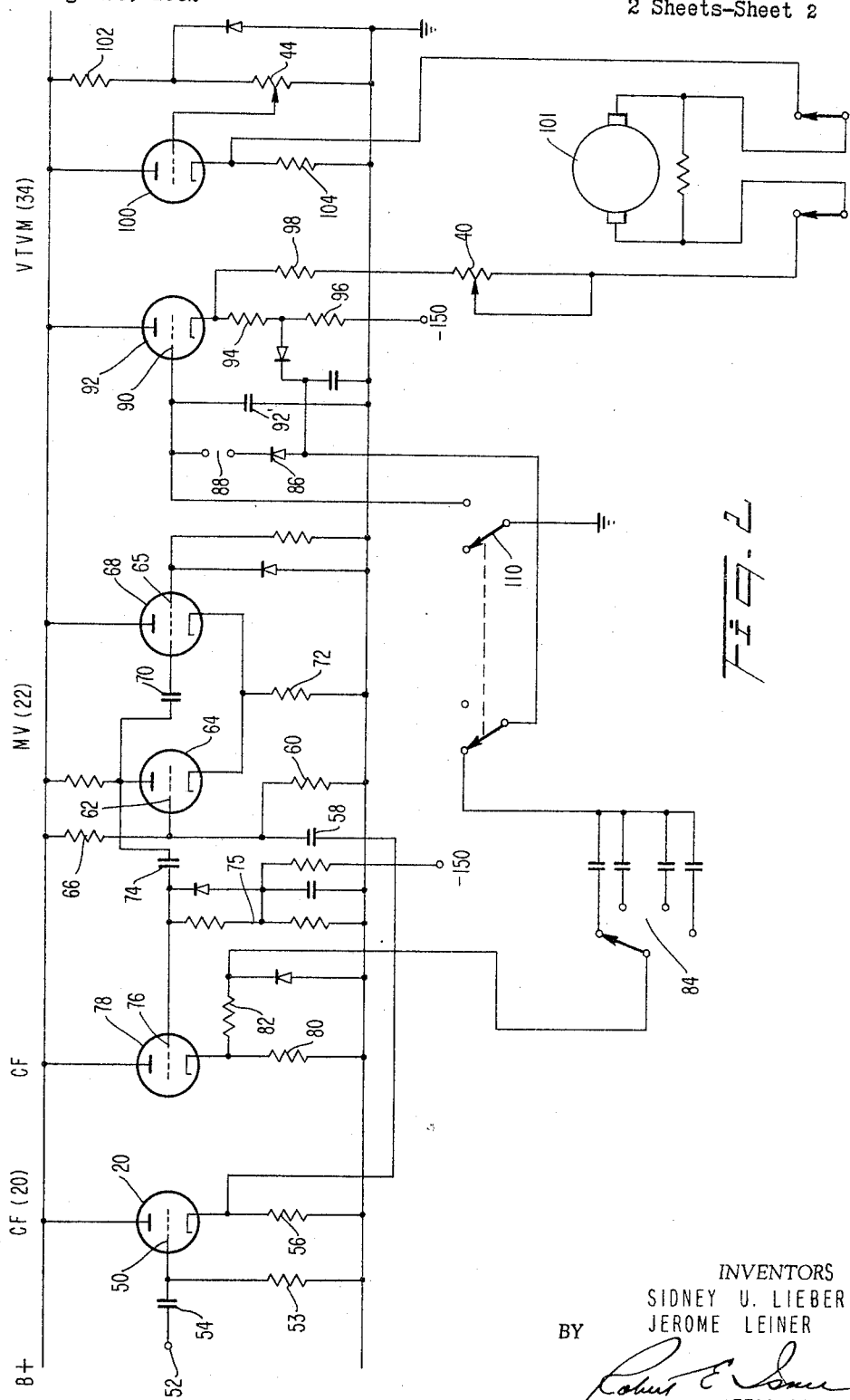

3,271,572
DIRECT READING BETA RAY COMPARATOR
Sidney U. Lieber, Bayside, and Jerome Leiner, Brooklyn, N.Y., assignors to Unit Process Assemblies, Inc., Woodside, N.Y., a corporation of New York
Filed Aug. 24, 1962, Ser. No. 219,322
6 Claims. (Cl. 250—83.3)

This invention relates to thickness measurements of thin coatings by beta ray reflection and particularly to an improved apparatus for effecting such measurements.

The principles underlying beta ray reflections or "backscatter" phenomena are well known and various types of non-destructive thickness measuring instruments incorporating these principles have been suggested by the art. In general, most, if not all of these instruments include a radioactive isotope source of beta radiation, a Geiger tube detector of the backscattered radiation and an auxiliary translating unit to measure or count the detected backscattered radiations and to provide a utilizable indication thereof.

Beta ray emission from an isotope source is essentially a random phenomenon. Thickness measurements based upon beta ray backscatter from a workpiece conventionally involve, for a given radioactive source and for a preselected time interval, a comparison of counts backscattered from the workpiece undergoing measurement with the counts backscattered from known standards, both suitably compensated for environmental backscattering attendant the physical disposition of the source, detector and the surfaces exposed to the radiation. Conventional translating devices provide utilizable numerical indications of the backscattered counts from which various graphs and calculations can be made to compute the thickness values of workpieces undergoing measurement. Such procedures, however, are relatively time consuming and do not lend themselves to rapid measurements of multiplicities of workpieces as is oftentimes desirably required in the practical utilization of beta backscatter thickness measuring instruments of the type herein of concern.

This invention may be briefly described as an improved construction for a translating device for beta backscatter thickness measuring instruments and which, in its broad aspects, includes means for converting backscattered counts into voltages of a magnitude proportional to the accumulation thereof and means for utilizing said voltages to afford a direct indication of the magnitude of the parameter being measured.

Among the advantages of the subject invention is the provision of an improved construction for a translating device for beta backscatter thickness measuring instruments capable of providing a direct indication of the magnitude of the parameter being measured; thus permitting rapid and sequential measurements on multiplicities of workpiece without calculation or computation and by relatively unskilled personnel.

The object of this invention is the provision of an improved translating device for beta backscatter thickness measuring instruments.

Other objects and advantages of the invention will be pointed out in the following disclosure and claims and will be illustrated in the accompanying drawings which delineate, by way of example, a presently preferred embodiment of the invention.

Referring to the drawings:

FIGURE 1 is a schematic block diagram of the essential components of the translating device forming the subject matter of this invention;

FIGURE 2 is a circuit diagram of the essential electrical components included in a presently preferred embodiment of the translating device forming the subject matter of this invention;

FIGURE 3a is a schematic graphic representation of an illustrative response curve;

FIGURE 3b is a schematic representation of a direct reading scale overlay constructed in accordance with the response curve of FIGURE 3a.

As is well known, beta backscatter measuring instruments are particularly adapted to measure extremely thin films or coatings of one material deposited or disposed on the surface of another and different material and are operatively effective as long as the atomic numbers of the coating and base material are sufficiently different. Conventionally such measurements are made by the following series of operation: (a) make an initial background count for a predetermined time interval; (b) make a base count for a base material sample, utilizing the same time interval; (c) calculate the actual base count by subtracting the background count therefrom; (d) make a series of gross counts for a range of known standards incorporating the same base material and known coating thicknesses of the same coating material; (e) calculate the net counts by subtracting the base count from each gross count therefor; (f) plot a curve of either percent increase of counts versus coating thickness or of net counts versus coating thickness; and (g) test unknown specimens and either calculate coating thickness by comparisons of such counts with the counts for the standards, or locate unknown specimen thickness by means of the above curve.

Referring now to the drawings and initially to FIGURE 1, the subject translating unit, the components of which are there illustrated in schematic block diagram form, is adapted to be utilized in a beta backscatter measuring instrument which may include a source of beta radiation 10, for example, a low activity radioactive isotope in a suitable cup or container, a workpiece supporting plate 12 having a target defining aperture 14 therein adapted to be overlaid by a workpiece 16 and upon the exposed area of which a desired measurement is to be made. Positioned beneath the beta ray source 10 is a detector 18, conventionally a Geiger tube such as model 1008 T as manufactured by Anton Electronic Laboratories of Brooklyn, New York, adapted to provide a discrete pulse-like voltage output in response to each reception of ionizing radiation thereby, with the number of such pulses or "counts" being proportional to the quantum of backscattered radiation received thereby.

The pulse output of the Geiger tube is applied to the input stage 20 of the translating device, such input stage suitably being in the nature of a cathode follower. The cathode follower output, which will be discrete pulses corresponding to the Geiger tube output, is utilized to sequentially trigger a single shot multi-vibrator 22. For each input trigger signal, the multi-vibrator 22 will generate a substantially rectangular output pulse 24 of predetermined amplitude and duration, for example a pulse of about 10 microseconds long and about 30 volts in amplitude. The multi-vibrator output, which is in the nature of a standardized voltage pulse per each received count, is fed into an integrator 26 whose period of functional operability is controlled by an auxiliary manually settable timer 28. The timer may be of a conventional construction, suitably a model 111 timer, as manufactured by Liebel-Flarsheim Co. of Cincinnati, Ohio.

As schematically illustrated in FIGURE 1, the integrator 26 essentially contains a capacitor 30 which will be successively and cumulatively charged to progressively higher voltage levels in accordance with the number of standard amplitude multi-vibrator output pulses 24 applied thereto during a preset time interval determined by the timer 28. A schematic designation of the stepped nature of the output wave of the integrating circuit 26 is illustrated at 32. The charge on the integrating condenser 30 which will have, at any instant, a magnitude proportional to the total number of counts emitted by the Geiger tube detector 18, is utilized to bias and thereby control the current level of a continuously conducting input tube in a vacuum tube volt meter 34. Such level of current flow is utilized to provide a visual indicia of magnitude by means of a conventional meter movement 36 such as D.C. milliammeter of the single coil galvanometer type having an associated needle 42 and dial 38, said dial being conveniently provided with a 0 to 100 basic scale. Associated with the vacuum tube voltmeter 34 and the meter movement 36 are manually controllable biasing means 40 and 44 in the nature of checkpoint and zero set controls which permit the selective biasing of the indicating meter movement and consequent location control of the indicating needle 42 relative to the scale 38 for the direct reading capability purposes as hereinafter set forth.

FIGURE 2 is a circuit diagram setting forth the circuit components included in a presently preferred embodiment of the translating device. As the majority of these components are of essentially conventional construction, a brief description thereof will only be presented.

As there illustrated, the discrete pulse output of the Geiger tube detector is applied to the control grid 50 of a triode tube arranged to constitute the cathode follower input stage 20 through the input terminal 52 thereto and coupling capacitor 54. The cathode follower stage 20 tube has its plate directly connected to the B+ supply and is provided with a grid leak resistor 53 and cathode resistor 56. A negative pulse output signal is taken from across cathode resistor 56 and is applied through a coupling condenser 58 to the grid 62 of the normally conducting input stage 64 of the single shot multi-vibrator 22.

The single shot multi-vibrator 22 is of essentially conventional construction with the first stage being maintained in normally stable conducting condition by the connection of the grid 62 to voltage divider network constituted by resistors 60 and 66 series connected intermediate the B+ supply and ground. The plate of the first stage 64 is directly coupled to the grid 65 of the second stage 68 through capacitor 70. The cathodes of both stages are connected to ground through a common resistor 72. The circuit constants of the multi-vibrator 22 are preselected so that upon each triggering thereof by a negative pulse applied to the grid 62 through coupling condenser 58, the multi-vibrator will cycle once and produce an output pulse on the plate of the first stage of predetermined amplitude and duration, suitably a pulse of about 10 microseconds duration and about 30 volts in amplitude.

The multi-vibrator output pulse is applied, through coupling condenser 74 to the grid 76 of a second cathode follower stage 78 which is normally biased beyond cutoff by the biasing network, generally designated 75 connected to a source of negative potential. The positive pulse output of cathode follower stage 78 is taken from across cathode resistor 80 and is applied through resistor 82 to one of a series of manually selectable charging rate control condensers, generally designated 84. The condensers 84 serve to permit a selective control of the charging rate for the hereinafter described control condenser 92 and thus permit accommodation of a wide range of counting rates by the Geiger tube detector.

The output side of the selected charging rate control condenser 84 is connected to a rectifier 86, the output side of which is disposed in series with the timer control switch contacts 88 and the grid 90 of the input stage 92 of the vacuum tube voltmeter 34. The control condenser 92 is connected from said grid 90 to ground so that the sequential pulses applied to the grid serve to cumulatively charge the condenser and raise the grid potential. Each pulse emitted by the second cathode follower stage 78 thus serves to incrementally charge control capacitor 92 and raise the D.C. level of the control grid 90 of the tube 92. The circuit constants associated with tube 92 are such that the current flow therethrough is proportional to such grid potential. Such current flow through tube 92 creates a voltage drop across cathode resistors 94 and 96 whose magnitude is proportional to the degree of tube current. The cathode voltage is applied through a series connected fixed resistor 98 and the checkpoint or sensitivity control potentiometer 40 to the positive input terminal of the meter movement deflection coil assembly 101 to produce a needle displacement proportional thereto.

The vacuum tube voltmeter also includes a normally conducting second stage 100 whose grid potential is controlled by the setting of the zero set or balancing potentiometer 44 included with resistor 102 in a voltage divider network connected intermediate the positive plate supply or B+ voltage therefor and ground. The degree of current flow through the tube 100 determines the potential appearing across cathode resistor 104 and such potential is direectly applied to the negative input terminal of the meter movement deflection coil assembly.

As will now be apparent, the zero set or balancing control 44 permits the level of current flow through the meter deflection coil to be adjusted independently of the count rate or level of current flow through tube 92 and thereby permits selective location of the indicating needle 42 relative to the dial 38 independent of the count rate. Specifically such permits the setting of the needle 42 opposite to the zero dial indicia irrespective of the count rate and thereby effectively permits establishment of a threshold response characteristic for the meter for any particular measurement sequence. The setting of the checkpoint or sensitivity control 40 controls the amount of resistance in the deflection coil circuit and thereby provides for a control of the sensitivity of the meter independent of the count rate and independent of the setting of the zero set control 44. Specifically such permits the setting of the needle 42, for any given count rate opposite any predetermined scale indicia and thus effectively permits establishment of a predetermined operational response characteristic in accordance with a predetermined count rate or an observed count rate from a particular specimen.

These two controls thus permit independent control of the operational response characteristics of the indicating meter and permit independent preselection of a threshold and predetermined operational response characteristic that will be directly indicatable on the meter dial as a result of the backscatter counts.

It will thus be seen from the above, that the subject circuit provides for the conversion of each of the discrete Geiger tube output pulses into discrete voltage pulses of fixed amplitude and duration and for the accumulation of said fixed ampltude pulses into a control potential whose magnitude is proportional to the summation of the amounts of beta radiation received by the Geiger tube.

The direct reading capability of the heretofore described translating unit through the functional operability of the heretofore described zero set and checkpoint controls is best described by considering two illustrative measurement sequences, such as for example the measurement of the thickness of thin gold coatings on a copper base, for a given radioactive source and a given "geometry" system for the Geiger tube 18, plate 12 and workpiece 16.

At this point reference can be made to FIGURE 3a which is intended to be illustrative of the configuration of a response curve. As there illustrated, such response curve includes a suitable checkpoint location A at about 75 to 80% of full scale.

The preferred direct reading sequence includes utilization of an auxiliary scale plate or overlay 120. Such auxiliary scale plate is predesigned for each coating-base combination for a predetermined range of coating thickness values and has the scale division markers thereon spaced in accordance with the configuration of the particular response curve for such combination. As illustrated at 122 in FIGURE 3b, the scale division markings are spaced in accord with the illustrative response curve of FIGURE 3a. Such auxiliary scale plates 120 can be readily pre-prepared for any desired character of workpiece and are formed so as to be readily removably mountable on the binding posts 124 with the scale markings 122 thereon disposed in aligned relation with the 0 to 100 scale 38 that is preferably integral with the meter. With a suitable auxiliary scale plate 120 properly mounted, a sample of the base material, i.e., copper for example, is placed on the plate 12 and subjected to beta radiation for a preset time interval as manually settable on the timer 28. The quantity of backscattered radiation, which will include backscatter both from the sample and the background, will accumulate over the preset time period and will be indicated by a certain amount of meter movement, say, for example, by displacement of the needle 42 to scale indicia 30 on the integral 100 unit scale 38. With the needle so positioned, the zero set potentiometer 44 is manually adjusted to bring the needle 42 opposite the zero registry mark on the scale and thus establish a threshold reading of zero for the particular counts representative of the base sample and background. The translating unit is then cleared by closing switch 110 to discharge capacitor 92 to ground. The base sample is then removed and a standard sample having a known coating thickness falling in the vicinity of point A on the FIGURE 3a curve, say, for example, about 42 micro inches, is then placed on the plate 12 and subjected to beta radiation for the same time period as was the base material. Such exposure which will result in a greater number of counts than the heretofore described threshold value thereof will result in a deflection of the meter needle 42 to a particular value on the 100 unit scale 38, say, for example about 75, such deflection being indicative of the magnitude of the number of counts above the threshold value thereof. At this point and after expiration of the time period the checkpoint or sensitivity potentiometer 40 will be adjusted to locate the needle 42 adjacent the scale value on the auxiliary scale plate 120 equal to actual coating thickness, i.e., 42, thereof. By the above procedure the operating response characteristics of the meter movement has now been independently and selectively biased so that the individual readings obtained on the subsequently exposed unknown samples may be directly read from the scale 122 on the auxiliary scale plate 120.

A second and somewhat simplified direct reading measurement system can also be effected with the subject translating unit in instances when the response curve for a particular coating-base combination is essentially of linear characteristic over at least a portion of its range, as for example, the portion O–C in the illustrative response curve of FIGURE 3a. In this procedure a base sample reading is taken, again for a preset time interval, and the zero set potentiometer is adjusted to set the needle 42 opposite the zero registry mark on the scale 38 to establish the threshold response characteristic. A standard sample having a known coating thickness in the vicinity of point C is then subjected to beta radiation for the same time period. The meter deflection resulting therefrom is then modified by the adjustment of the checkpoint potentiometer so as to locate the needle 42 adjacent the scale value on scale 38 corresponding to the actual thickness thereof. By the above procedure, the operating level of the meter movement has been appropriately independently and selectively biased so that individual readings obtained in subsequently exposed unknown samples of thicknesses falling between O and C may be read directly from scale 38.

Having thus described our invention, we claim:

1. In a beta backscatter instrument for measuring the thickness of thin coatings on a basal substrate wherein a beta ray detector element emits discrete pulses each representative of randomly received backscattered radiation, means for converting said emitted pulses into a potential whose magnitude is proportional to the summation of the number thereof, indicating means including a removably mountable dial plate member selectively scaled in accordance with the backscatter count characteristics of the composite coating and basal substrate materials being subjected to measurement and a member arcuately displaceable relative thereto in accordance with the magnitude of said potential and means for varying the response band of said arcuately displaceable member to permit selective prealignment of the threshold response characteristic and a predetermined operational response characteristic thereof relative to said selectively scaled dial independent of said potential for providing direct visual indicia of the magnitude of said potential within a predetermined range of values thereof.

2. In a beta backscatter instrument for measuring the thickness of thin coatings on a basal substrate wherein a beta ray detector element emits discrete pulses each representative of randomly received backscattered radiation, means for converting said emitted pulses into a potential whose magnitude is proportional to the summation of the number thereof, indicating means physically displaceable in accordance with the magnitude of said potential, selectable scale means having division markings thereon selectively scaled in accordance with the backscatter count characteristics of the composite coating and basal substrate materials being subjected to measurement removably mountable adjacent to said indicating means to provide a comparative visual indication of the magnitude of displacement of said indicating means and means for selectively aligning said indicating means, when selectable in displaced condition, relative to the threshold marking on said selected scale means and relative to a second marking thereon remote for said threshold marking thereon independent of said potential to permit direct visual comparison of the magnitude of successive deflections thereof.

3. The combination as set forth in claim 2 wherein said selectable scale means has two terminal end values delineated thereon and wherein said last mentioned means comprises first means for aligning said indicating means with one terminal end of said scale means.

4. The combination as set forth in claim 2 wherein said selectable scale means has two terminal end values delineated thereon and wherein said last mentioned means comprises second means for aligning said indicating means with one terminal end of said scale means.

5. In a beta backscatter instrument for measuring the thickness of thin coating on basal substrate wherein a beta ray detector emits discrete pulses, each representative of randomly received backscattered radiation, means for converting said emitted pulses into a potential whose magnitude is proportional to the summation of the number thereof, indicating means physically displaceable in proportion to the magnitude of said potential, selectable scale means having division markings thereon selectively scaled in accordance with the backscatter count characteristics of the composite coating and basal substrate materials being subjected to measurement and removably positionable relative to the path of displacement of said indicating means for providing comparative visual indication of the magnitude of displacement of said indicating means, first control means for controlling the threshold response characteristic of said indicating means independent of said potential to permit prealignment of said indicating means relative to a terminal end of said scale means and division marking second control means for controlling the sensitivity of said indicating means independent of said potential and said first control means to permit prealignment of said indicating means, when displaced by a predetermined potential, with a desired scale division marking indicia.

6. The combination as set forth in claim 2 wherein said removably mountable scale means is selectable from a plurality thereof each selectively scaled in accordance with the backscatter count characteristics of various coating and basal substrate materials subjectable to measurement.

References Cited by the Examiner

UNITED STATES PATENTS

| | | | |
|---|---|---|---|
| 2,874,354 | 2/1959 | Bell | 250—83 X |
| 2,885,639 | 5/1959 | Tewksbury et al. | 324—115 |
| 2,936,374 | 5/1960 | Zimmer | 250—83.3 X |
| 2,951,159 | 8/1960 | Mariner | 250—83.3 X |

RALPH G. NILSON, *Primary Examiner.*

ARCHIE R. BORCHELT, *Examiner.*